Nov. 7, 1950 A. T. WILLIAMS ET AL 2,528,716
EXPOSURE METER
Filed Oct. 29, 1946 3 Sheets-Sheet 1

Inventor:
Alexander T. Williams,
Paul Huber,
By Pierce, Scheffler & Parker,
Attorneys.

Nov. 7, 1950     A. T. WILLIAMS ET AL     2,528,716
EXPOSURE METER
Filed Oct. 29, 1946     3 Sheets-Sheet 2
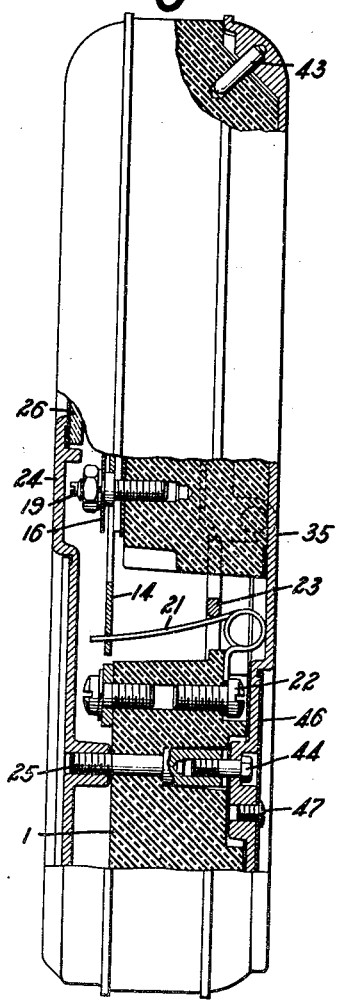
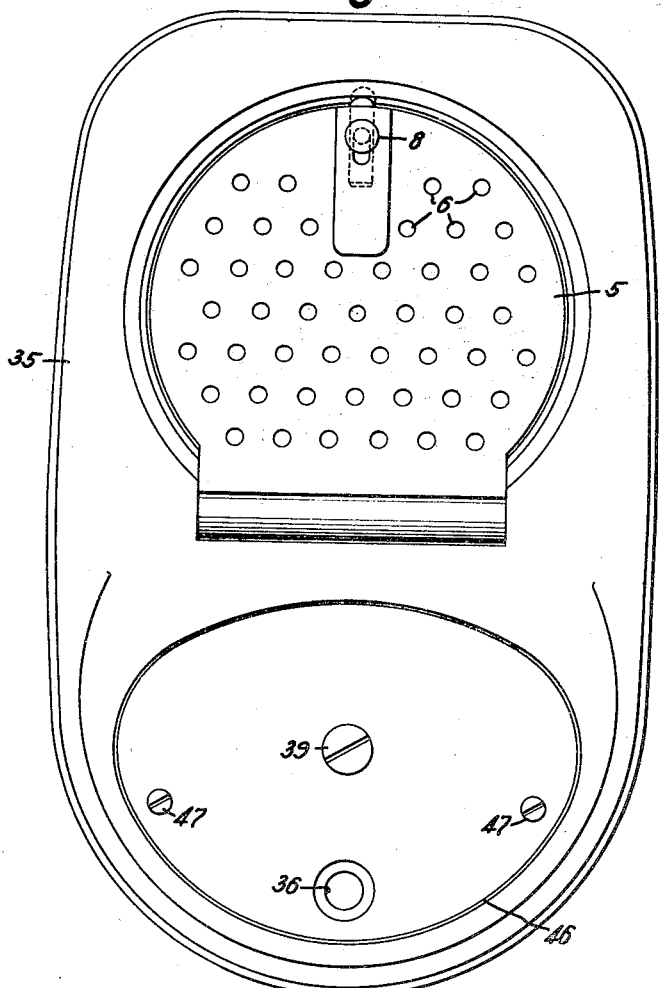
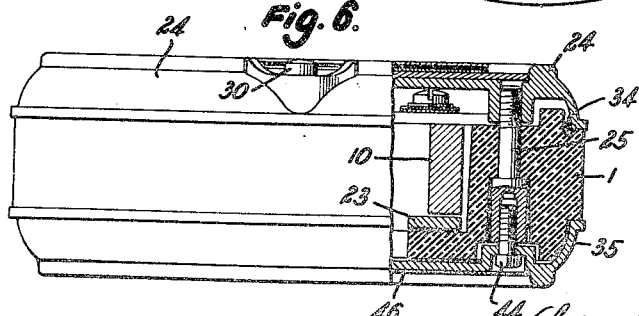

Nov. 7, 1950 A. T. WILLIAMS ET AL 2,528,716
EXPOSURE METER
Filed Oct. 29, 1946 3 Sheets-Sheet 3

Inventor:
Alexander T. Williams,
Paul Huber,
By Pierce, Scheffler & Parker,
Attorneys.

Patented Nov. 7, 1950

2,528,716

UNITED STATES PATENT OFFICE 2,528,716

EXPOSURE METER

Alexander T. Williams, Westfield, and Paul Huber, Hillside, N. J., assignors to Weston Electrical Instrument Corporation, Newark, N. J., a corporation of New Jersey Application October 29, 1946, Serial No. 706,346

7 Claims. (Cl. 88—23)

This invention relates to photometers and to exposure meters such as are used to determine exposure data for photographic purposes.

The invention is not restricted to photometers of the photoelectric type but the particular embodiment which will be described is a photoelectric exposure meter of the double range type such as is described and claimed in Patent No. 2,274,441, Alexander T. Williams.

Objects of the invention are to simplify the mechanical construction of photometers and exposure meters, and to reduce the weight and the overall dimensions of such devices. Objects are to provide exposure meters with casings having window openings at opposite faces for admitting light to a photocell and for viewing an instrument scale, and in which the casing includes an intermediate section of skeleton form upon which all elements of the photoelectric and measuring system are mounted, and closures secured to the opposite faces of the intermediate section to complete the casing.

These and other objects and advantages of the invention will be apparent from the following description when taken with the accompanying drawings in which:

Fig. 4 is a side elevation, with parts in section as seen on the plane of line 4—4 of Fig. 1;

Fig. 5 is a rear elevation of the exposure meter;

Fig. 6 is an end elevation, with parts in section as seen on the plane of section line 6—6 of Fig. 1.

Figure 1:
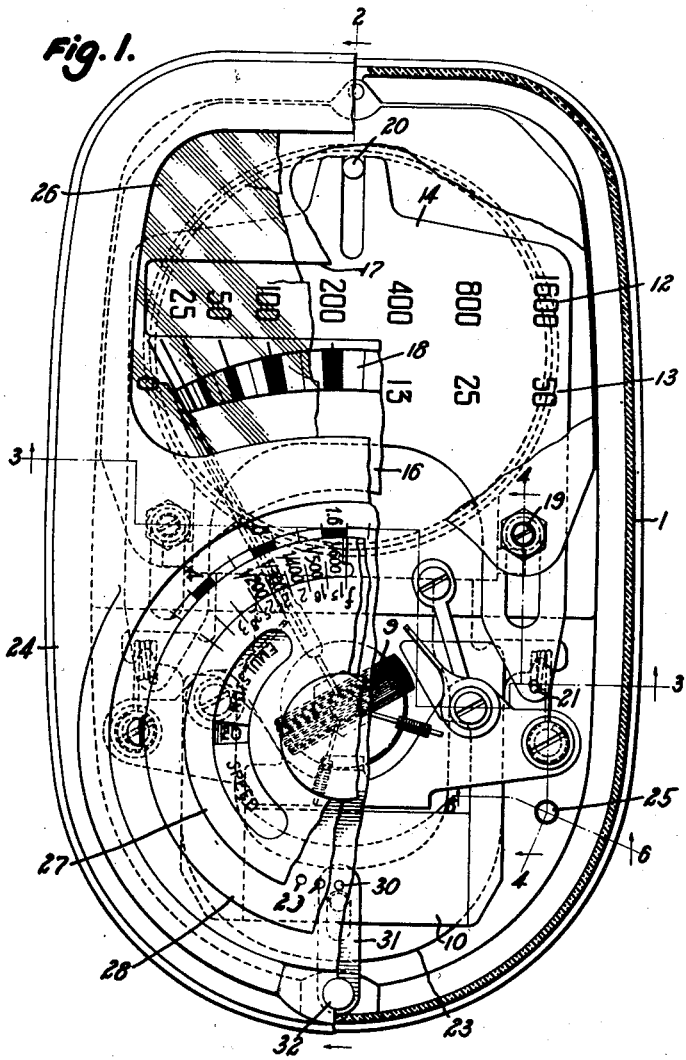
Fig. 1 is a front elevation, with parts broken away, of an exposure meter embodying the invention.

In the drawings, the reference numeral 1 identifies the intermediate section of the exposure meter casing, which section is a molded body of insulating material constituting an elongated base of skeleton form upon which the photocell 2 and all elements of the associated measuring instrument are mounted. A main or permanently operative light-restricting system comprising a multiple lens plate 3 and multiple compartment baffle 4 extends over the photocell 2, and an auxiliary baffle or relatively thick plate 5 having small diameter openings 6 in axial alinement with the lens elements, when the auxiliary baffle is in operative position, is hinged upon the base section 1 for movement into and out of operative position. A spring-pressed plunger 7 is slidably mounted on the baffle plate 5 to engage a recess in the base section 1 to latch the auxiliary baffle in operative position, the plunger having a knob 8 for latching the auxiliary baffle in inoperative position.

The measuring instrument includes a coil 9 which is pivotally supported for angular movement in the interpolar gap of a permanent magnet 10, and a pointer 11 carried by the coil for movement over a double range scale plate system. The coil 9 is preferably supported by internal bearings such as described and claimed in the co-pending application of Paul Huber and Alexander T. Williams, Serial No. 706,376 filed October 29, 1946, which matured into Patent No. 2,463,770 on March 8, 1949.

The high and low graduations 12, 13 of brightness values are printed or engraved upon a plate 14 which is supported for sliding movement between a back plate 15 and a scale plate 16 having a rectangular window 17 through which the scale graduations of the sliding plate 14 may be viewed. A scale 18 or series of lines extending radially of the axis of the moving coil 9 are drawn or etched on the scale plate 16 adjacent the window opening 17.

Figure 7:
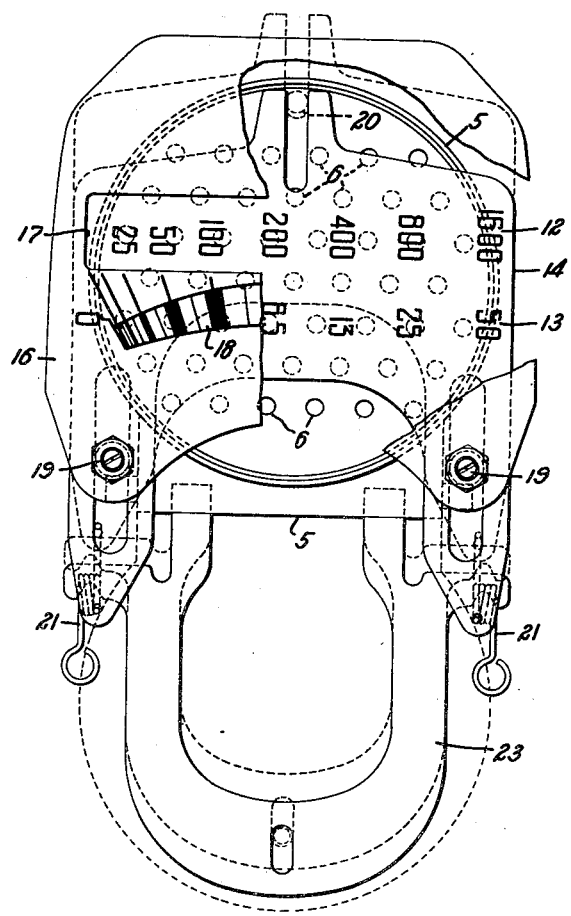
Figs. 7 and 8 are fragmentary schematic front elevation and side views of the movable graduated scale plate and associated parts.
Figure 8:
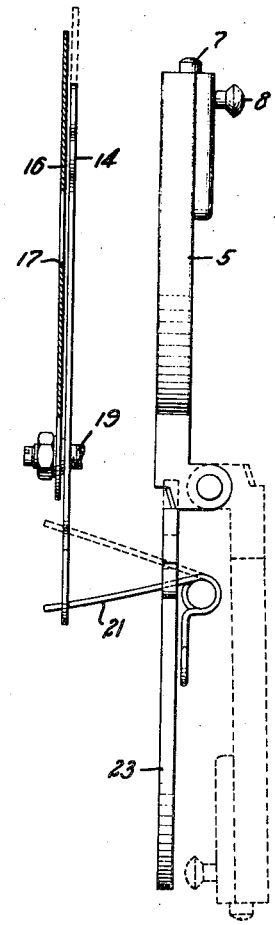

The sliding plate 14 is guided for rectilinear movement by two screws 19 which are threaded into the base section 1 and support the inner end of the scale plate 16, and a stud 20 which is riveted to the back plate 15. The plate 14 is resiliently pressed upwardly (as viewed in Fig. 1) towards its low scale position, by a pair of hairpin springs 21 which are located adjacent the opposite edges of the base section 1, each spring 21 having one end extending through an aperture in the sliding plate 14 and another end anchored to the base section 1 by a screw 22. The plate is moved downwardly, as viewed in Figs. 1, 7 and 8, to expose the high range graduations 12 at the window opening 17 of plate 16 when the auxiliary baffle 5 is moved into operative position overlying the lens plate 3 to reduce the acceptance angle of the photocell. This shifting of the plate 14 is effected by a yoke 23 of generally U-form having ends slidably mounted in the base 1 and having notches in which the respective springs 21 are seated, the legs of the yoke being located in the path of movement of the inner end of the auxiliary baffle 5 when it is adjusted into position over the lens plate 3.

A domed cover plate 24 is secured to the base section 1 by screws 25 which extend through the base section from its rear face, and the plate 24 has an opening across which a window glass 26 is secured by means, not shown, to permit a view of the scale plates 14 and 16. A multiple disk computer 27 is mounted upon the cover plate 24, and the intermediate disk 28 thereof which is adjustable angularly in accordance with the film speed has a series of concealed openings 29 for cooperation with a locking pin 30 which extends through and is anchored in a keyhole slot of a link or strap 31 which is carried by a pushbutton 32. The pin 30 is normally projected into one of the openings 29 by a spring 33 which is seated in alined recesses in the base 1 and the pushbutton 32, and the pin is withdrawn to permit adjustment of the computer disk 28 by depressing the pushbutton 32.

Figure 2:
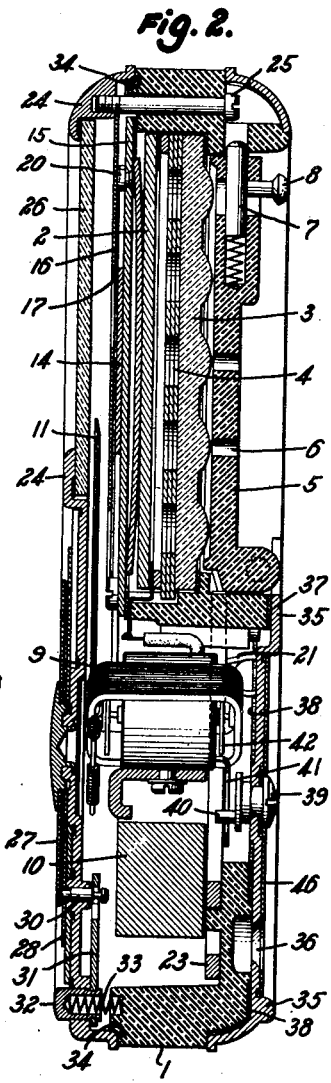
Fig. 2 is a longitudinal section on line 2—2 of Fig. 1.
Figure 3:
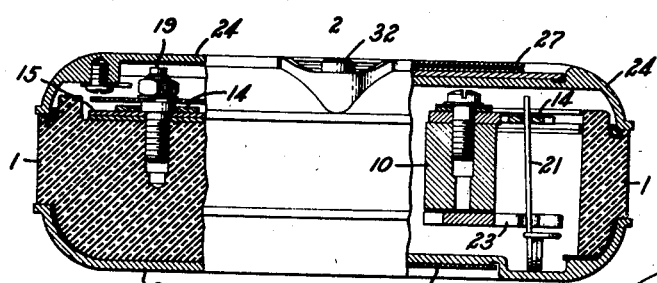
Fig. 3 is an end elevation, with parts in section as seen on the plane of section line 3—3 of Fig. 1.

A gasket 34 is located in a recess extending around the flat edge of the base 1, and the rim of the cover plate 24 seats upon the flat edge and engages the gasket to provide a tight joint for the casing. A second concave or domed casing cover 35 has a flat rim for seating upon the flat edge portion at the other face of the base section 1, i. e., the face at the right as shown in Fig. 2, and the rear face of the exposure meter when it is in use. The rear cover plate has a large aperture to admit light to the photocell and to permit movement of the auxiliary baffle into and out of operative position, and a small opening 36 which receives the knob 8 of the baffle latch pin 7 to retain the baffle in inoperative position. These openings in the front cover plate 35 are sealed by gaskets 37, 38 respectively. A zero corrector 39 is carried by the plate 35 and has an eccentric pin 40 extending through a slot in the angularly adjustable abutment 41 to which the outer end of the spring 42 of the coil 9 is anchored.

The rear cover plate 35 is secured to the base section 1 by a pair of pins 43 which are seated in alined and angularly arranged sockets at one end of the base section 1 and the cover plate 35, and screws 44 which may be threaded into the other end of the base section 1 or, as shown, into the counterbored and threaded ends of screws 25 which secure the other cover plate 24 to the base section. The heads of the screws 44 are preferably countersunk in the cover plate 35, and a name plate is secured to the cover plate 35 by screws 47 to conceal the screws 44 which must be removed to gain access to the interior of the exposure meter casing. The name plate 46 is apertured to clear the latching opening 36 of cover plate 35 and the zero adjuster 39.

The cover plates 24 and 35 may be molded from a natural or synthetic resin but preferably, as illustrated, the cover plates are of metal to obtain the required strength and stability in a casing of minimum thickness.

It is to be understood that the invention is not limited to the particular embodiment herein shown and described, and that various changes which may occur to those familiar with the design and construction of photometers fall within the spirit of the invention as set forth in the following claims.

We claim:

1. A photometer comprising a skeleton base section of insulating material having openings extending therethrough from one face to the opposite face thereof, a photocell and means mounting the same in one opening of the base section, a measuring instrument and means mounting the same in another opening of said base section, and apertured cover plates of opaque material secured over and substantially coextensive with said opposite faces of said base section to complete a casing for the photometer.

2. A photometer as recited in claim 1 wherein one cover plate has a transparent plate over an aperture thereof for viewing the instrument and an aperture of the other cover plate admits light to the photocell.

3. A photometer comprising an elongated base section of insulating material having flat edge portions at its opposite faces, a photocell and a measuring instrument supported on said base section, a domed cover plate having a rim seated upon the flat edge portion at one face of said base section, screws extending through said base section and into said cover plate to secure the same to the base section, a second domed cover plate having a rim seated upon the flat edge portion at the opposite face of said base section, each cover plate being substantially coextensive with and completely overlying said base section, and means including screws extending through said second cover plate from the exterior thereof to secure the second cover plate to the base section to complete the casing of the photometer.

4. A photometer as recited in claim 3, wherein said securing means includes a pin extending into complementary sockets at one end of said elongated base section and said second cover plate, the axis of the pin being inclined to the plane of the flat edge portion contacted by the rim of the second cover plate, the screws of said securing means being located adjacent the opposite end of said base section and the second cover plate.

5. A photometer as recited in claim 3, in combination with a name plate detachably secured to said second cover plate to conceal the heads of the screws of said securing means.

6. A photometer as recited in claim 3, wherein said securing means includes a pin extending into complementary sockets at one end of said elongated base section and said second cover plate, the axis of the pin being inclined to the plane of the flat edge portion contacted by the rim of the second cover plate, the screws of said securing means being located adjacent the opposite end of said base section and the second cover plate, in combination with a name plate detachably secured to said second cover plate to conceal the heads of the screws of said securing means.

7. An exposure meter comprising an insulating base section of elongated skeleton form, a photocell and a measuring instrument mounted on said base section, the measuring instrument including a pointer and cooperating scale means at the face of the base section opposite that upon which the photocell is mounted, a main baffle in fixed position overlying said photocell, an auxiliary baffle pivotally supported upon said base section for angular movement into and out of an operative position overlying said main baffle, a front cover plate secured to said base section and having a window for viewing said pointer and scale means, and a rear cover plate secured to said base section to complete a casing for the exposure meter, said rear cover plate having an aperture through which light is admitted to the photocell, said cover plates being coextensive with and completely overlying the base section.

ALEXANDER T. WILLIAMS.
PAUL HUBER.

REFERENCES CITED

The following references are of record in the file of this patent:

UNITED STATES PATENTS

| Number | Name | Date |
| --- | --- | --- |
| 479,592 | Goldschmid | July 26, 1892 |
| 2,101,296 | Simpson et al. | Dec. 7, 1937 |
| 2,105,255 | Mihalyi et al. | Jan. 11, 1938 |
| 2,123,670 | Weston | July 12, 1938 |
| 2,150,047 | Bernhard et al. | Mar. 7, 1939 |
| 2,151,901 | Devaux et al. | Mar. 28, 1939 |
| 2,214,283 | Norwood | Sept. 19, 1940 |
| 2,274,441 | Williams | Feb. 24, 1942 |
| 2,346,529 | Whittenton | Apr. 11, 1944 |
| 2,353,163 | Reinarth | July 11, 1944 |
| 2,363,796 | Lamb | Nov. 28, 1944 |
| 2,401,598 | Wood | June 4, 1946 |
| 2,408,944 | Miller | Oct. 8, 1946 |